Feb. 2, 1932.　　　G. REIME ET AL　　　1,843,518
METER MAGNET STRUCTURE
Filed May 1, 1930
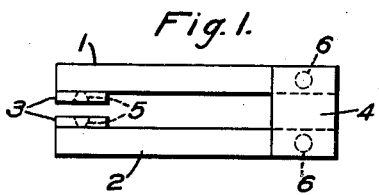
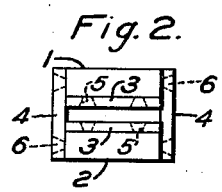
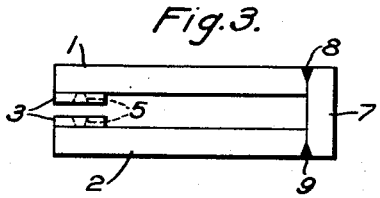
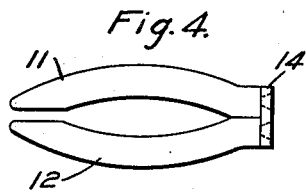
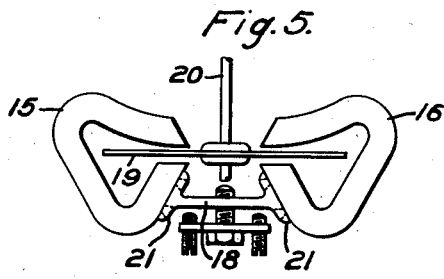
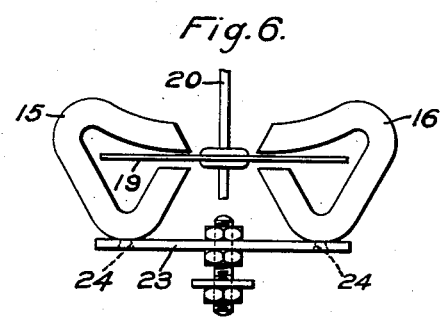
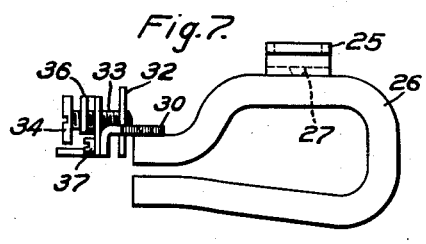
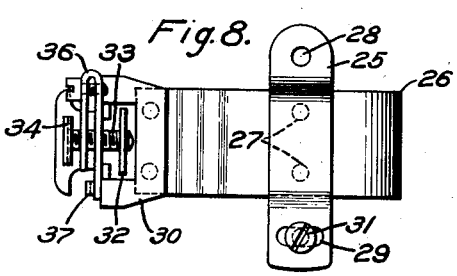
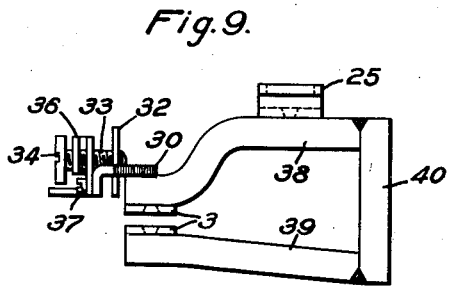
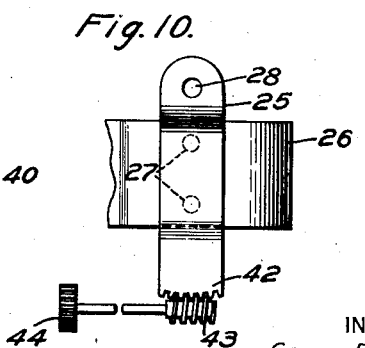
INVENTORS
Georg Reime &
Georg Hofmann
BY
ATTORNEY Patented Feb. 2, 1932

1,843,518

UNITED STATES PATENT OFFICE

GEORG REIME, OF BEHRINGERSDORF, NEAR NUREMBERG, AND GEORG HOFMANN, OF NUREMBERG, GERMANY, ASSIGNORS TO WESTINGHOUSE ELECTRIC & MANUFACTURING COMPANY, A CORPORATION OF PENNSYLVANIA

METER MAGNET STRUCTURE

Application filed May 1, 1930, Serial No. 449,057, and in Germany May 11, 1929.

Our invention relates to magnet structures and particularly to permanent damping magnets for watthour meters.

One object of our invention is to provide a magnet structure that shall be simple and durable in construction, economical to manufacture and effective in its operation.

Another object of our invention is to provide an effective means for securing damping-magnet elements of cobalt steel to each other.

Another object of our invention is to provide means whereby magnet elements of cobalt steel may be effectively joined to cooperating elements of other material.

A further object of our invention is to avoid the careful fitting and machining of certain magnet elements, such as those of cobalt steel, and to overcome other difficulties heretofore encountered in this art.

It is desirable, in magnet structures, such as the permanent damping magnets of watthour meters, to have the elements constituting the structure of simple shape and of substantially the same cross-sectional area, and, where portions of different cross-sectional areas are provided, to avoid defects in the portions of smaller cross section.

Particularly, where cobalt steel is employed, it is difficult, if not impossible, to retreat the magnet, because of its excessive hardness, and it is only feasible to employ elements of simple form which do not have appreciable differences in cross-sectional areas.

Mounting of the magnets and securing the component parts thereof together are, therefore, difficult by the usual methods involving the use of set screws or other carefully fitted parts.

It is our aim to overcome the above-mentioned, and other, difficulties attending the construction of meter magnets, particularly those embodying cobalt steel, and, in practicing our invention, we so weld component elements together and similarly join supporting, flux-controlling and other appurtenant elements thereto, either before or after the hardening of the magnet elements, that the elements may initially be worked or fabricated in a better and more economical manner than after the appurtenant elements have been welded to the body of the magnet.

To prevent stray lines of force from reaching any appurtenant member which has been welded to the magnet, the appurtenant members may be of the so-called non-magnetic rustless steel. In preferred forms of our invention, the joined elements are spot-welded or certain of the elements are provided with perforations in which the body of welding material is deposited.

Figure 1 of the accompanying drawings, is a side elevational view of a horse-shoe magnet constructed in accordance with our invention, Fig. 2 is an end elevational view of the device shown in Fig. 1, Figs. 3 and 4 are views, similar to Fig. 1, of modified forms of our invention, Fig. 5 is a side elevational view of a portion of a watthour meter embodying our invention, Fig. 6 is a view, similar to Fig. 5, of a modified form thereof, Fig. 7 is a side elevational view of a watthour-meter or relay damping magnet, a supporting element and a flux-adjusting element mounted thereon in accordance with our invention, Fig. 8 is a plan view of the device shown in Fig. 7, Fig. 9 is a view, similar to Fig. 7, of a further modified form of our invention, and Fig. 10 is a plan view of a modified form of one of the elements shown in Fig. 8.

Referring to Figs. 1 and 2, the device is of substantially horse-shoe shape comprising bar elements 1 and 2, preferably of cobalt steel and of uniform rectangular cross-section, pole-tip element 3, preferably of soft iron, and elements 4, preferably of cobalt steel. The pole-tip elements 3 are secured to the members 1 and 2, preferably by spot-welding bodies of welding material through openings 5 in the elements 3. The members 4 may be similarly welded to the members 1 and 2 through openings 6 in the elements 4. The latter have a total cross-sectional area substantially equal to the cross-sectional area of the bar 1 or the bar 2 and are disposed along the sides of the bars, as shown, to lend rigidity to the structure.

The elements 4 constitute yoke or intermediate portions of the magnet, the members 1 and 2 constitute the arms thereof and the elements 3 provide adjacent pole surfaces between which the disc armature of a watthour meter or a relay may operate.

In Fig. 3, in which corresponding parts are designated by corresponding reference characters, the construction is similar to that of Fig. 1, except that a single intermediate yoke or member 7 of substantially the same cross-sectional area as the bar 1 or the bar 2 is secured across the rear ends of the members 1 and 2, as by welding at positions 8 and 9, respectively. In this form, the adjacent portions of the elements 1, 2 and 7 may be bevelled, as illustrated, to provide substantially V-grooves in which the bodies 8 and 9 are deposited.

In Fig. 4, the elements 1 and 2, of the structures of the previous figures, are replaced by preformed arcuate arms 11 and 12 that are joined, at one end, by a yoke element 14 similar to the manner in which the members 4 are joined to the members 1 and 2 of Figs. 1 and 2.

In the form of our invention shown in Fig. 5, damping magnets 15 and 16 are welded to a supporting bracket 18 and disposed in the usual operative relation to a watthour-meter armature disc 19 that is mounted on a spindle 20. In this construction, the supporting bracket 18 is provided with oppositely disposed sloping arms 21 having outer supporting surfaces conforming to adjacent inner surfaces of the magnets 15 and 16. The bracket 18 is preferably of the so-called rustless non-magnetic steel or other material having low magnetic coercive force.

In the form of our invention shown in Fig. 6, in which parts corresponding to parts shown in Fig. 5 are referred to by corresponding reference characters, the bracket 18 of Fig. 5 is replaced by a supporting member 23 of similar material which is preferably spot-welded, at positions 24, to the magnets 15 and 16.

Figs. 7 and 8 illustrate a form of our invention in which a metal strip 25 of low coercive force is welded to a magnet element 26, as by spot-welding at positions 27. The member or strip 25 is suitably secured to a meter frame (not shown), as by a pivot pin 28. The opposite end of the strip 25 is provided with an arcuate slot 29, drawn about the axis of the pin 28, whereby, in cooperation with a set screw 31 which extends through the slot 12, the magnet 26 may be adjusted relative to the meter armature.

Also, in the structure shown in Figs. 7 and 8, a bracket member 30 of low coercive force is welded to one arm of the magnet 26 for supporting a flux-controlling element 32, the element 32 being mounted on a screw 33 having an adjusting head 34 at one end. The screw 33 extends through a member 36 that is secured to the bracket 30, as by screws 37.

Our invention, as illustrated in Fig. 9, is substantially a composite of the elements shown in the other figures, in comprising arms 38 and 39 constituting modified forms of the arms 1 and 2 of the structure of Figs. 1 and 2, pole-tip elements 3 of the structure shown in Figs. 1 and 2, a yoke element 40 corresponding to the yoke element 7 of Fig. 3, an adjustable mounting strip 25 corresponding to the adjustable mounting strip of Figs. 7, 8 and 9, and a bracket 30 and the co-related elements 32, 33, 34, 36 and 37 thereof, as shown in Figs. 7 and 8.

As illustrated in Fig. 10, the strip 25 of the structure shown in Figs. 7 and 8, instead of being provided with the slot 12, is provided with a toothed portion 42 for cooperation with a worm screw 43 which may be operated by a handle 44.

Our invention, as above described, permits a wide variety of combinations of the elements set forth, in any combination of which certain of the difficulties attending the use of similar devices, as heretofore constructed, have been overcome.

While we have shown and described particular forms of our invention, changes may be affected thereon without departing from the spirit and scope thereof as set forth in the appended claims.

We claim as our invention:

1. A permanent damping-magnet structure for watthour meters comprising a composite element of substantially C-shape including arms of cobalt-steel and of substantially uniform cross-sectional area throughout and a yoke structure of cobalt-steel welded to said arms and having a total cross-sectional area comparable to the cross-sectional area of one of said arms, soft iron pole-tip elements welded to the free ends of said arms, a rustless substantially non-magnetic steel member welded to said element for adjustably mounting the same, means for controlling the flux of the element and a rustless non-magnetic steel member welded to said element for adjustably supporting said flux-controlling means.

2. A permanent magnet comprising a composite element of substantially C-shape of uniform cross-sectional area throughout including autogenously-joined adjacent sections, a soft-iron pole-tip body welded to one free end thereof, a substantially non-magnetic metal member welded to said element for mounting the same, means for controlling the flux of the element, and a substantially non-magnetic metal member welded to said element for adjustably supporting said flux-controlling means.

In testimony whereof, we have hereunto subscribed our names this 11 day of April, 1930.

GEORG REIME.
GEORG HOFMANN.